RALPH H. WISE
INVENTOR.

Jan. 6, 1953     R. H. WISE     2,624,604
VEHICLE DOOR LOCK

Filed July 20, 1950     2 SHEETS—SHEET 2

RALPH H. WISE
INVENTOR.

BY E. C. McRae
J. R. Faulker
D. H. Oster
ATTORNEYS

Patented Jan. 6, 1953

2,624,604

UNITED STATES PATENT OFFICE 2,624,604

VEHICLE DOOR LOCK

Ralph H. Wise, Wayne, Mich., assignor to Ford Motor Company, Dearborn, Mich., a corporation of Delaware Application July 20, 1950, Serial No. 174,955

2 Claims. (Cl. 292—30)

1

This invention relates generally to motor vehicle door locks and has particular reference to locks of the type employing a pair of cooperating latch arms.

An object of the present invention is to provide a lock mechanism particularly suited for use in connection with the luggage compartment door of a motor vehicle, but also adaptable for use in connection with other vehicle doors as well. It is a further object of the invention to provide a door lock of this type which is positive in action and virtually theft proof, and which comprises a minimum number of parts and accordingly is inexpensive to manufacture and assemble.

Another object of the invention is to provide a vehicle door lock in which a pair of latch arms are pivotally mounted for swinging movement about spaced axes, each of the latch arms having a retaining portion engageable with a retainable portion of a striker carried by the adjacent fixed body structure of the vehicle. The retaining portions of the latch arms are adapted to embrace the striker and to be simultaneously operated to release the striker when it is desired to open the door.

Other objects and advantages of the present invention will be made more apparent as this description proceeds, particularly when considered in connection with the accompanying drawings wherein.

Figure 1:
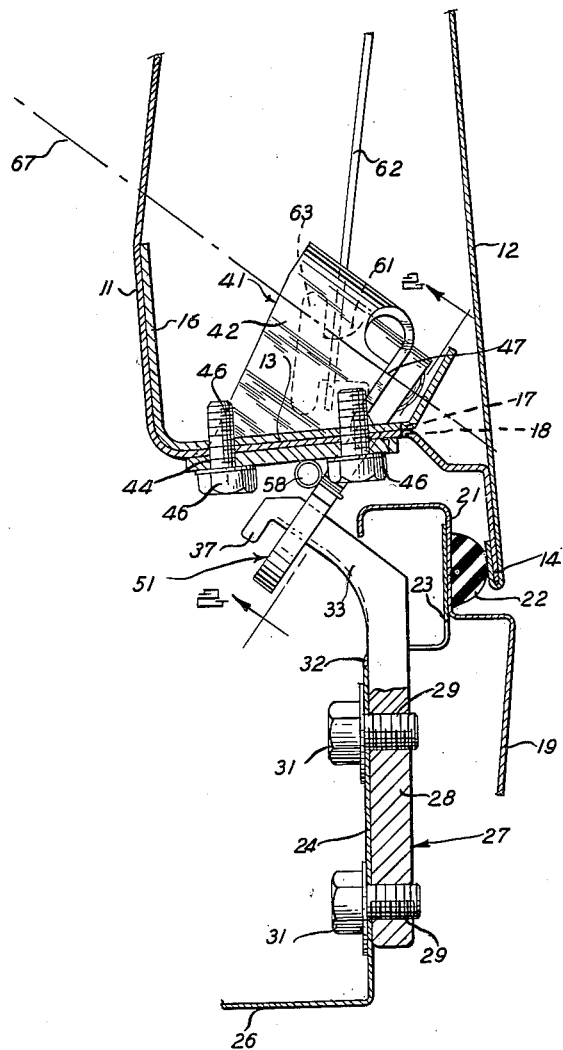
Figure 1 is a vertical cross-sectional view through a portion of the luggage compartment door of a motor vehicle and illustrating the lock mechanism of the present invention.

The embodiment of the invention illustrated in the drawings shows the lock mechanism as applied to the luggage compartment door of a motor vehicle. The door comprises inner and outer panels 11 and 12 with the inner panel 11 being bent at right angles to form a jamb face 13. The two panels are joined at their marginal edges to form a lower flange 14. A generally L-shaped reinforcing member 16 is positioned adjacent the inner surfaces of the inner panel 11 and the jamb face 13, and aligned apertures 17 and 18 are formed in the reinforcing member 16 and the jamb face 13 of the door respectively to permit the lock mechanism to extend into the interior of the door, as will be described later.

The luggage compartment door is hingedly

2 mounted upon the vehicle body for pivotal movement about a remote axis in the conventional manner, and in its closed position the outer door panel 12 forms a continuation of the lower back body panel 19 of the body. The back panel 19 has an inwardly offset flange 21 supporting a weather strip 22 engaged by the lower marginal flange 14 of the door in its closed position. The upper flange 21 of the back body panel is secured to the outwardly offset portion 23 of the vertically extending flange 24 of the luggage compartment floor panel 26.

Figure 2:
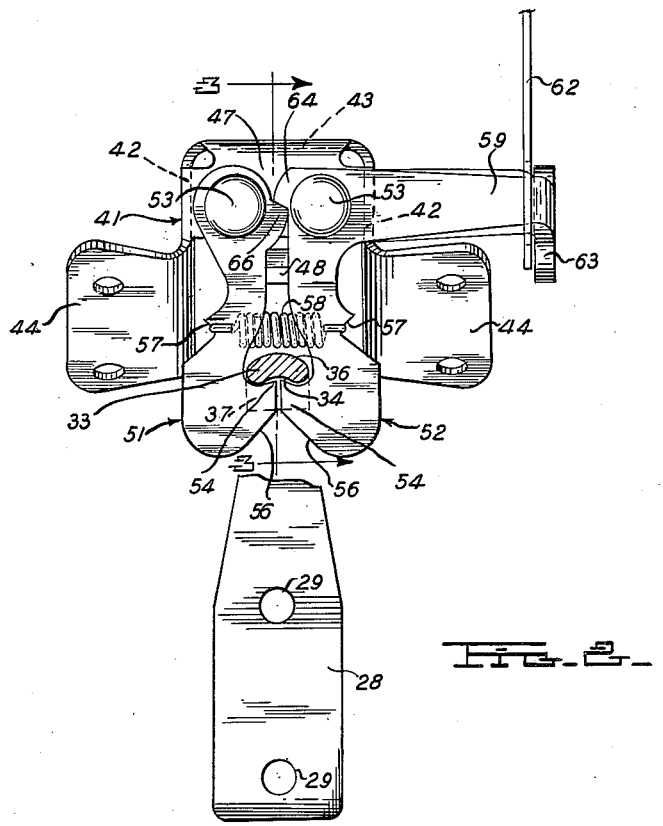
Figure 2 is a transverse cross-sectional view taken on the line 2—2 of Figure 1 and showing part of the lock mechanism in rear elevation.

A striker 27 is formed with a vertically extending body portion 28 provided with tapped holes 29 engaged by studs 31 extending through the vertical flange 24 of the floor panel to bolt the striker to the outer surface thereof. The body portion of the striker extends through an opening 32 in the flange 24 to project into the interior of the luggage compartment, and is formed with an integral inwardly and upwardly inclined retainable portion 33. As best seen in Figure 2 the retainable portion 33 of the striker has a lower concave surface 34 and an upper convex surface 36. The striker terminates at its inner end in a downwardly depending safety flange 37.

Latch mechanism for cooperation with the striker 27 is mounted upon the jamb face 13 of the luggage compartment door. The latch mechanism comprises a generally inverted U-shaped supporting bracket indicated generally by the reference character 41. The bracket 41 has side flanges 42 interconnected by an upper flange 43. The lower portions of the side flanges 42 are bent laterally outwardly to form integral attaching flanges 44 positioned adjacent the jamb face 13 of the door with the side flanges 42 of the bracket extending into the interior of the door. Bolts 46 secure the supporting bracket to the door.

Figure 3:
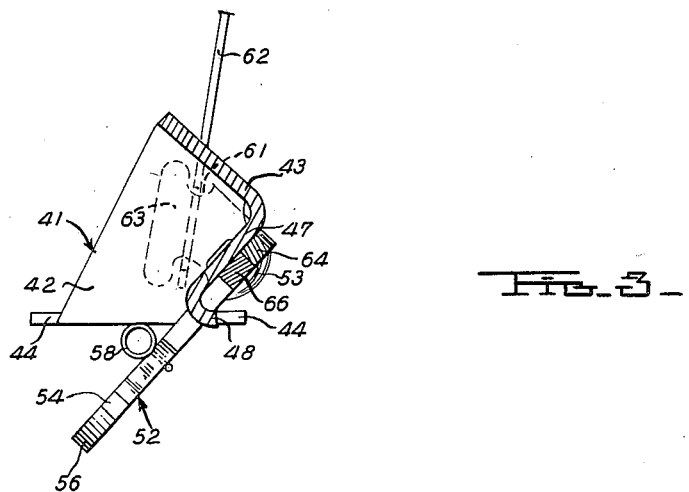
Figure 3 is a vertical cross-sectional view taken on the line 3—3 of Figure 2.

As best seen in Figure 3, the upper flange 43 of the supporting bracket 41 is formed with an integral downwardly extending rearward flange 47, the edges of which are positioned adjacent the rearward edges of the side flanges 42 of the bracket and are preferably welded thereto to form a rigid structure. At the central portion of the lower edge of the rearward flange 47 of the bracket, an integral tab 48 is bent outwardly for a purpose made clear hereafter.

A pair of latch arms 51 and 52 are pivotally mounted upon the supporting bracket 41 by means of shoulder rivets 53 extending through the arms and the rearward flange 47 of the bracket. Referring to Figure 2, it will be seen that the arms are mounted for swinging movement about spaced parallel axes.

The two latch arms are generally similar insofar as their lower portions are concerned, each having complementary hook-shaped projections 54 extending toward each other and lower cam surfaces 56. Notches 57 are formed in the outer edges of the latch arms to receive the ends of a coil spring 58 constantly tending to urge the latch arms toward each other.

The two latch arms are arranged for simultaneous swinging movement away from each other upon actuation of one of the arms. It will be seen that the right hand arm 52 as viewed in Figure 2, is the actuated arm and is generally in the shape of a bell crank lever having an integral laterally extending arm 59. Referring now to Figure 3, the arm 59 is reduced in thickness adjacent its ends to provide a reduced grooved portion 61 adapted to be engaged by a slotted actuating link 62. The extreme outer end of the arm 59 of the latch member 52 is formed with a return bend retaining flange 63 preventing separation of the link 62 from the arm 59 except when the link is rotated to a position parallel to the retaining flange 63. The upper end of the actuated link 62 is connected to a suitable actuating handle or other device (not shown) of the conventional type.

The right hand actuated latch member 52 is formed with an integral projecting lug 64 generally in the form of a tooth. The lower surface of the lug 64 is arranged to bear against the upper surface of a complementary lug 66 projecting outwardly from the left hand latch member 51. It will be apparent that counterclockwise rotation of the right hand latch member 52 under the actuation of link 62 is effective, through the interengaging lugs 64 and 66 on the latch members, to simultaneously rotate the left hand latch member 51 in a clockwise direction. As a result, the two latch members are spread apart against the action of the return spring 58 and the hook-shaped retaining flanges 54 of the latch members are separated from each other and disengaged from the striker 27.

As best seen in Figure 2, the hook-shaped retaining flanges 54 of the latch members are formed to cooperate with the lower concave surface 34 of the retainable portion 33 of the striker to hold the door in latched position with the latch members embracing the striker. A balanced latch action is thus obtained with either of the latch members being effective to prevent inadvertent or unauthorized unlatching. It will be noted that the left hand latch member 51 could be rotated in a clockwise unlatching direction without disturbing the latching engagement of the right hand latch member 52, due to the arrangement of the interengaging lugs 64 and 66.

During the movement of the luggage compartment door toward its closed position, the latch members 51 and 52 will be held together by the return spring 58, but will automatically be separated to permit the portion 33 of the striker to pass therebetween upon engagement of the lower cam surfaces 56 of the latch members with the upper concave surface 36 of the striker. After the striker has passed beyond the hook-shaped projections 54 of the latch members the return spring will move the latch members toward each other into latching engagement with the striker.

The latch members 51 and 52 are arranged in a common plane and this plane extends generally at right angles to the plane 67 passing through the hinged axis of the luggage compartment door and intersecting the pivotal axes of the latch members. The retainable portion 33 of the striker extends at right angles to the plane of the latch members 51 and 52 and consequently during the initial opening movement of the door or the final closing movement thereof the latch members move at right angles to the striker. Safety flange 37 depending from the inner end of the retainable portion 33 of the striker is effective as a safety measure to prevent the latch members from becoming disengaged from the inner end of the striker.

When released from the striker, the latch members 51 and 52 are centered by means of the central lug 48 projecting from the rear flange 47 of the supporting bracket, being held thereagainst by the return spring 58.

The latch mechanism is virtually theft and tamper proof by reason of the dual engagement of the striker with the two latch members, the latching action of either of which is sufficient to hold the door in latched position. Furthermore, the particular arrangement of the latch mechanism is such that it cannot readily be operated by means of a tool inserted between the weather strip 22 and the lower flange 14 of the door, and consequently the construction provides a safe and positive latch mechanism formed of a relatively few parts.

While the embodiment of the invention shown illustrates the latch mechanism as applied to the luggage compartment door of a vehicle, the device is applicable also to other vehicle doors with slight structural changes in the arrangement of the latch arms and striker.

It will be understood that the invention is not to be limited to the exact construction shown and described, but that various changes and modifications may be made without departing from the spirit and scope of the invention, as defined in the appended claims.

What is claimed is:

1. In a latch mechanism for a motor vehicle door having separated inner and outer panels and a jamb face at its free edge provided with an opening therein, a supporting bracket having laterally spaced mounting flanges secured to the jamb face of the door on opposite sides of said opening and integral side walls extending at right angles to said mounting flanges through said opening into the interior of said door, the side walls of said bracket extending at right angles to the inner and outer panels of said door, a top wall integrally joining said side walls and extending into a downwardly bent rearward wall closing the rearward portion of said supporting bracket, a pair of latch arms pivotally mounted upon said rearward wall within said door for pivotal movement about laterally spaced axes, said latch arms being normally positioned adjacent each other and projecting through the opening in the jamb face of the door, the projecting portions of said latch arms having opposed retaining portions, the rearward wall of said bracket having an outwardly bent tab centrally of its width projecting between said latch arms and forming a stop therefor, spring means interconnecting said latch arms and yieldably holding said latch arms against said tab, an actuating lever integrally formed on one of said latch arms and projecting laterally from said supporting bracket within said door for manual actuation, and interengaging lugs on said latch arms closely adjacent the pivotal mountings for said latch arms to provide simultaneous operation of said latch arms.

2. In a latch mechanism for a luggage compartment door of a motor vehicle having a lower generally horizontally extending jamb face and inner and outer generally vertically extending panels adjacent said jamb face, said jamb face being provided with a rectangular opening therein, a supporting bracket having laterally spaced mounting flanges secured to the jamb face of the door on opposite sides of said opening and integral side walls extending generally vertically upwardly from said mounting flanges through said opening into the interior of said door, said side walls being inclined rearwardly toward the outer door panel, a top wall integrally joining said side walls, a rearward laterally extending wall closing the rearward portion of said supporting bracket and also being inclined upwardly and outwardly with respect to said jamb face, a pair of latch arms adjacent said rearward wall and extending parallel thereto, means pivotally connecting said latch arms to said rearward wall for pivotal movement about laterally spaced axes, said latch arms being normally positioned closely adjacent each other and projecting through the opening in the jamb face of the door, the projecting portions of said latch arms having opposed retaining portions, a tab integrally formed on said rearward wall projecting rearwardly therefrom between said latch arms to form a stop therefor, a coil spring interconnecting said arms adjacent said stop and yieldably holding the latch arms against said stop, one of said latch arms being in the form of a bell crank having an actuating arm extending at right angles to the latch arm portion of the bell crank for manual operation, and interengaging lugs on said latch arms closely adjacent the pivotal mountings for said latch arms to provide simultaneous operation of said latch arms.

RALPH H. WISE.

REFERENCES CITED

The following references are of record in the file of this patent:

UNITED STATES PATENTS

| Number | Name | Date |
|---|---|---|
| 267,168 | Dudley | Nov. 7, 1882 |
| 841,910 | West | Jan. 22, 1907 |
| 1,200,178 | Ehrman | Oct. 3, 1916 |
| 1,541,483 | D'Ardenne | June 9, 1925 |